United States Patent
Ross et al.

[15] 3,642,393
[45] Feb. 15, 1972

[54] APPARATUS FOR THE MANUFACTURE OF GRANULES

[72] Inventors: Gerhard Ross, Niederhofheim Taunus; Bernhard Reul, Schneidhain Taunus; Walter Tillmann, Frankfurt am Main; Reinhardt Liebenhoff, Kelkheim Taunus, all of Germany

[73] Assignee: Farbwerke Hoechst Aktiengesellschaft Vormals Meister Lucius & Bruning, Frankfurt am Main, Germany

[22] Filed: Apr. 9, 1970

[21] Appl. No.: 28,658

[30] Foreign Application Priority Data

Apr. 12, 1969 Germany .................... P 19 18 685.7

[52] U.S. Cl. ................................................ 425/6, 29/1.22
[51] Int. Cl. ........................................................ B29c 23/00
[58] Field of Search ......................... 18/1 A, 1 B, 2.4, 12 A; 29/1.22

[56] References Cited

UNITED STATES PATENTS

| | | | |
|---|---|---|---|
| 2,601,642 | 6/1952 | Stammer et al. | 18/2.4 X |
| 3,148,045 | 9/1964 | Schott | 18/2.4 X |
| 3,282,066 | 11/1966 | Searight | 18/2.4 X |

Primary Examiner—H. A. Kilby, Jr.
Attorney—Curtis, Morris & Safford

[57] ABSTRACT

An apparatus has been provided for the manufacture of bead-shaped granules from melts. It comprises a melt-containing vessel with a distributing bottom and a heating chamber for heating the distributing bottom, wherein the outlet apertures of the heating chamber have the shape of annular gaps which are formed by borings in the external wall of the heating chamber and by small tubes inserted into the distributing bottom and protruding through the bottom of the heating chamber.

3 Claims, 1 Drawing Figure

PATENTED FEB 15 1972 3,642,393
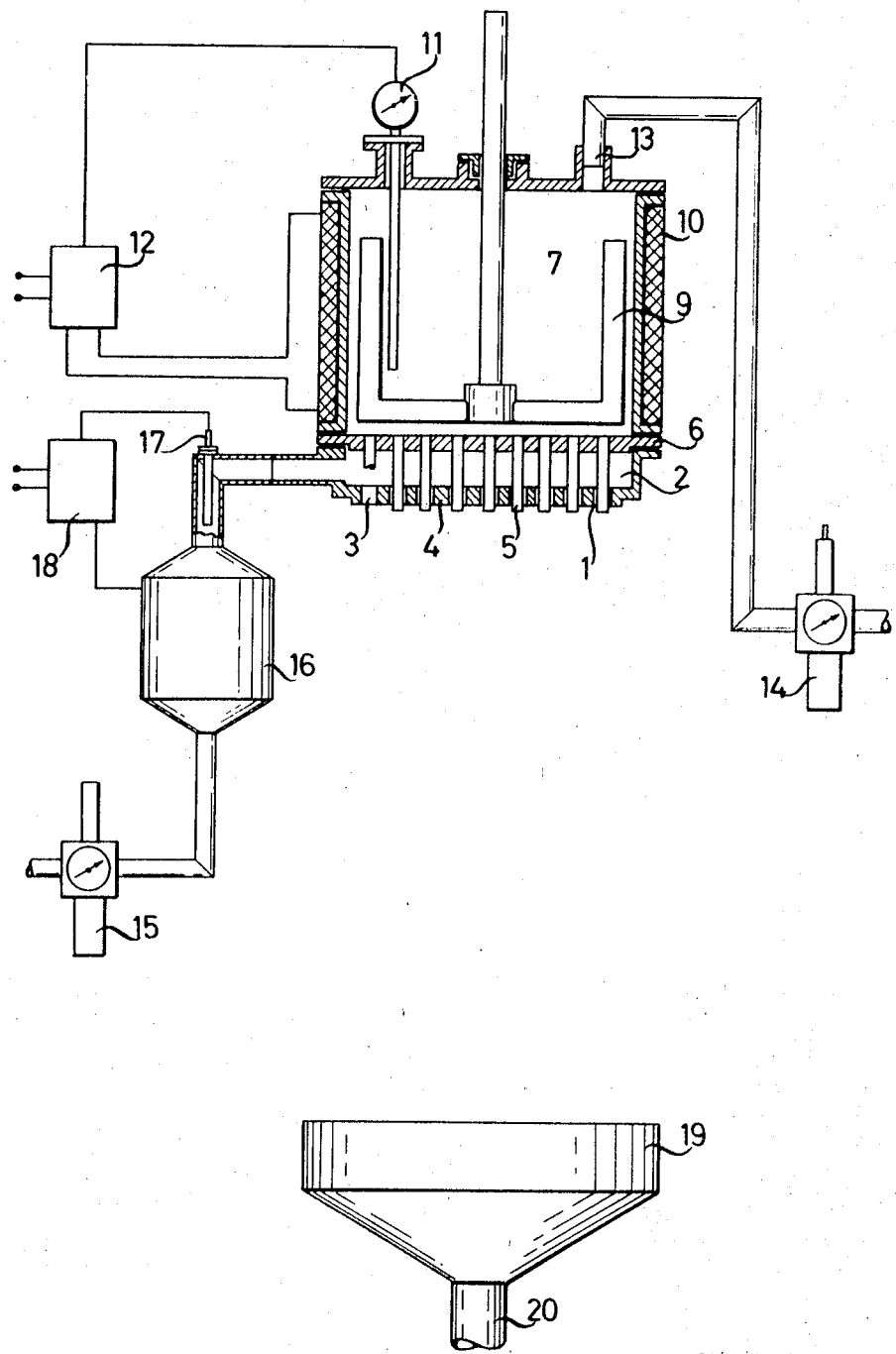
INVENTORS
GERHARD ROSS
BERNHARD REUL
WALTER TILLMANN
REINHARDT LIEBENHOFF

APPARATUS FOR THE MANUFACTURE OF GRANULES

The present invention provides an apparatus for the manufacture of bead-shaped granules from melts of organic and/or inorganic substances. The melts may contain solids in finely distributed or dissolved form. The melts may be those used, for example, in the industry of plastics or fertilizers or in the industry of pharmaceuticals, for example those used in the manufacture of bead pills.

A known apparatus serving for the manufacture of pills from melts comprises a container for taking up the melt, a heating chamber for heating said container and a distributing bottom. The melt is discharged through a valve at the bottom which has the form of a circular slide valve. With each half rotation of the slide valve one drop of the melt falls into a liquid coolant in which it solidifies to form a pill.

The slide valve periodically interrupts the flow of the melt. The melt which is being discharged or dropped off behind the slide valve, however, is subject to the same principles as, for example, the melt flowoff from another dropoff surface, which corresponds to the slide valve outlet. Thus, the drop formation depends essentially on the surface tension and on gravity. Under the action of these forces, the melt contracts below the outlet face and tears away under formation of a main drop and one or several smaller drops. This process can be accelerated only at the expense of the drop size. High-melt speeds eventually lead to a spray effect and therewith to a wide dispersion of the drop size having its maximum in the range of the smallest diameters of the drops.

The known apparatus is not suitable for the preparation of preponderantly coarse granules on an industrial scale, because the formation of a larger melt drop takes place very slowly; it takes at least 1 second and, if special requirements regarding a uniform size are made, it takes up to 1 minute. The particle sizes forming by spraying are in most cases below 50 $\mu$m., referred to the maximum of the frequency of the drop size; the granules formed therefrom impede in many cases further processing or direct use.

Another disadvantage of the known apparatus is the fact that it comprises a vessel which contains a liquid into which the drops fall to solidify therein. For further use, it is namely necessary that the granules be freed from the liquid as completely as possible.

The object of the present invention is an apparatus for the manufacture of bead-shaped granules, which avoids the above-described disadvantages and comprises a container with distributing bottom for taking up the melt and a heating chamber for heating the distributing bottom and which apparatus is characterized by the fact that the outlet apertures 1 of the heating chamber 2 have the shape of annular gaps which are formed by borings 3 in the external wall 4 of the heating chamber and by small tubes 5 inserted into the distributing bottom 6 and protruding through the bottom of the heating chamber.

The hot gas which flows out from the gaps of the apparatus of the invention considerably accelerates the formation of drops. Spherelike granules are formed whose diameter can be varied by a change of the gas pressure.

The accompanying drawing illustrates by way of example an embodiment of the apparatus of the invention, which in no way is intended to limit the scope of the invention. The outlet apertures 1 of the heating chamber have a ringlike shape. These are formed by borings 3 in the wall of the heating chamber 4 and by small tubes 5 in the distributing bottom 6.

The distributing bottom 6 separates the pressuretight melt-containing vessel 7 from the heating chamber 2. The vessel containing the melt is suitably provided with a stirring device 9 and with a heating device 10 which is positioned in the jacket and which keeps the temperature of the melt constant by means of a contact thermometer 11 and a controlling device 12. The vessel is furthermore provided with a connecting socket 13 through which the inner space of the vessel is connected with a reducing device 14 for compressed gas, for example air or nitrogen.

Another reducing device 15, which in its operation is independent of the device 14, supplies the quantity of gas required for the operation of the heating chamber 2. The temperature of the gas can be adjusted exactly, for example with the aid of heat exchanger 16, contact thermometer 17 and control device 18. Furthermore, a dry collecting funnel 19 is provided which receives the granules and discharges them through the discharge socket 20.

For operating the apparatus, the melt is heated to a temperature which is some degrees above the solidification range and kept constant at this temperature, while stirring, by means of the temperature controlling device 10, 11 and 12.

Then, the reducing device 15 for the hot gas, for example air, and the reducing device 14 for the compressed gas are switched on. The hot gas is adjusted so as to have a pressure ranging from about 0.05 to about 0.5 atmospheres gauge, the hot gas temperature is adjusted to a value of about 3° to about 8° C. above the solidification range of the melt so that dropping off from the small outlet tubes starts. The temperature of the hot gas must be chosen in such a manner that the emanating melt does not solidify and remains liquid. The dropoff frequency is almost the same at all tube outlets, because the tubes are uniformly heated by the streaming hot gas and the hot gas which leaves through the annular gap between the borings 3 and the small tubes 5 counteracts the creeping effect of the melt and so prevents changes of the tearoff cross section. The dropoff frequency can be influenced by variation of the extrusion pressure at the reducing device 14.

The drop size is in the range of about 0.2 to about 2.0, preferably 0.5 to 1.1, diameters of the small tubes, in a range which is dependent on the gas pressure. The so-called secondary drops which have considerably smaller diameters are of no importance here, in contradistinction to spraying, because the little particles of melt are falling down vertically. If the melts are thinly liquid, the operation may be effected sometimes without the use of compressed gas. The melt is then extruded under the pressure of the melt which is above the small tubes. If the vessel which contains the melt is arranged separately from the granulating apparatus, the pressure may also be produced, for example by means of a pump.

The hot gas which cools rapidly prevents agglomeration of the particles during their fall; after a fall of some meters, they are already so solidified that no agglomeration or baking occurs in the collecting funnel which is positioned at a corresponding depth. If the melt solidifies particularly slowly, for example under the influence of additives, an acceleration of the solidification can be brought about, for example by evaporating nitrogen or by another low-boiling substance which is brought in countercurrent to the falling particles.

The small tubes 5 which are arranged uniformly at the bottom within the area given by the heating chamber are preferably so designed as to protrude by about 0.5 to about three tube diameters out from the wall of the heating chamber. If he protrusion is below this limit, an undesired tearoff of the drops may occur if high-hot gas pressures are used and if simultaneously the melt has a low-surface tension. If the protrusion is too high above the indicated limit, the effect of the hot gas on the drop tearoff and on the creeping effect of strongly wetted melts diminishes.

The small tubes may consist of smooth tubes which are welded or fastened by shrinking into the distributing bottom. In some cases, especially in the case of highly viscous melts, it is of advantage to give the outlet ends of the small tubes a nozzlelike shape by shaping them conelike. In other cases, a nozzlelike widening may advantageously increase the tearoff surface.

When assembling the apparatus of the invention, care must be taken that the outlet ends of the small tubes are well centered in the borings of the wall of the heating chamber. If the outlets of the small tubes have the shape of nozzles, it is of advantage to use nozzle heads that may be screwed on or slipped on and to fasten them to the borings in the wall of the heating chamber or to the wall of the heating chamber. Any insert pieces or similar known devices used for centering and fastening should be arranged in such a manner that the flowoff of the hot gas is as far as possible unhindered and remains vertical.

As materials for the apparatus of the invention, the materials conventionally used in the construction of melt containers, heating chambers, etc., may be used.

The essential advantages of the apparatus of the invention reside in the comparatively high output and in the preponderantly uniform size of the granules. The proportion of fine granules due to secondary drops is small and the separation of this small proportion is in most cases not necessary.

We claim:

1. Apparatus for the manufacture of bead-shaped granules from melt, comprising a melt containing vessel having a melt distributing bottom plate, a heating chamber operatively connected to said vessel with said bottom plate forming the top of said chamber, said heating chamber having a plurality of generally circular outlet apertures in an external wall thereof, means for supplying hot gases to said chamber and a plurality of small tubes in said chamber in direct contact with the hot gases therein and having smaller diameters than said apertures, each of said tubes having one end secured to said bottom plate in communication with said melt containing vessel and having the other end thereof extending through an associated one of said apertures to define an annular gap therebetween for the escape of hot gases from said chamber.

2. An apparatus as claimed in claim 1, wherein the small tubes protrude from said external wall of the heating chamber by about 0.5 to about three diameters of the small tubes.

3. An apparatus as claimed in claim 1, wherein the outlet ends of the small tubes have the shape of nozzles.

* * * * *